US006597824B2

(12) United States Patent
Newberg et al.

(10) Patent No.: US 6,597,824 B2
(45) Date of Patent: Jul. 22, 2003

(54) OPTO-ELECTRONIC DISTRIBUTED CROSSBAR SWITCH

(75) Inventors: Irwin L. Newberg, Pacific Palisades, CA (US); Dwight J. Mellema, Pasadena, CA (US)

(73) Assignee: Raytheon Company, Lexington, MA (US)

( * ) Notice: Subject to any disclaimer, the term of this patent is extended or adjusted under 35 U.S.C. 154(b) by 222 days.

(21) Appl. No.: 09/772,318

(22) Filed: Jan. 28, 2001

(65) Prior Publication Data

US 2002/0102046 A1 Aug. 1, 2002

(51) Int. Cl.[7] .................................................. G02B 6/26
(52) U.S. Cl. ..................................... 385/16; 385/18
(58) Field of Search ............................. 385/13, 16–18, 385/24; 359/113, 124, 128, 138, 139

(56) References Cited

U.S. PATENT DOCUMENTS 5,774,245 A * 6/1998 Baker ......................... 359/128
6,118,561 A * 9/2000 Maki ........................... 359/124

* cited by examiner

Primary Examiner—Hung Xuan Dang
Assistant Examiner—Mohammad Abutayeh
(74) Attorney, Agent, or Firm—Leonard A. Alkov; Glenn H. Lenzen, Jr.

(57) ABSTRACT

The invention is an optoelectronic (OE) crossbar switch (10) for both digital and analog signals, used either separately or combined, whose functions are reconfigurable and distributed. The invention allows multiple senders to be connected with multiple receivers simultaneously. The invention uses optical filters for wavelength division multiplexing and demultiplexing (WDM and WDD). A single fiber module input/output port carries multiple bi-directional signals that are optically filtered out in the module using WDM/WDD filters (12) at each sender/receiver and then selected after optical filtering using photodiode detectors (15) as detectors and switches. Laser transmitters (14), photodiode detectors (15), and smart electronics (18) are used to implement the crossbar switch functions. In addition to optical filters, the use of time division multiplexing (TDM) and code division multiple access (CDMA) implemented either electrically or optically are taught to increase the number of independent users that the distributed switch handles. The switch can be cascaded with other switches using optical bridging circuits (100) to create a scaleable interconnect fabric. An arbitration technique can be used which allows signals to be sent only when the intended receiver is capable of accepting these signals.

58 Claims, 13 Drawing Sheets

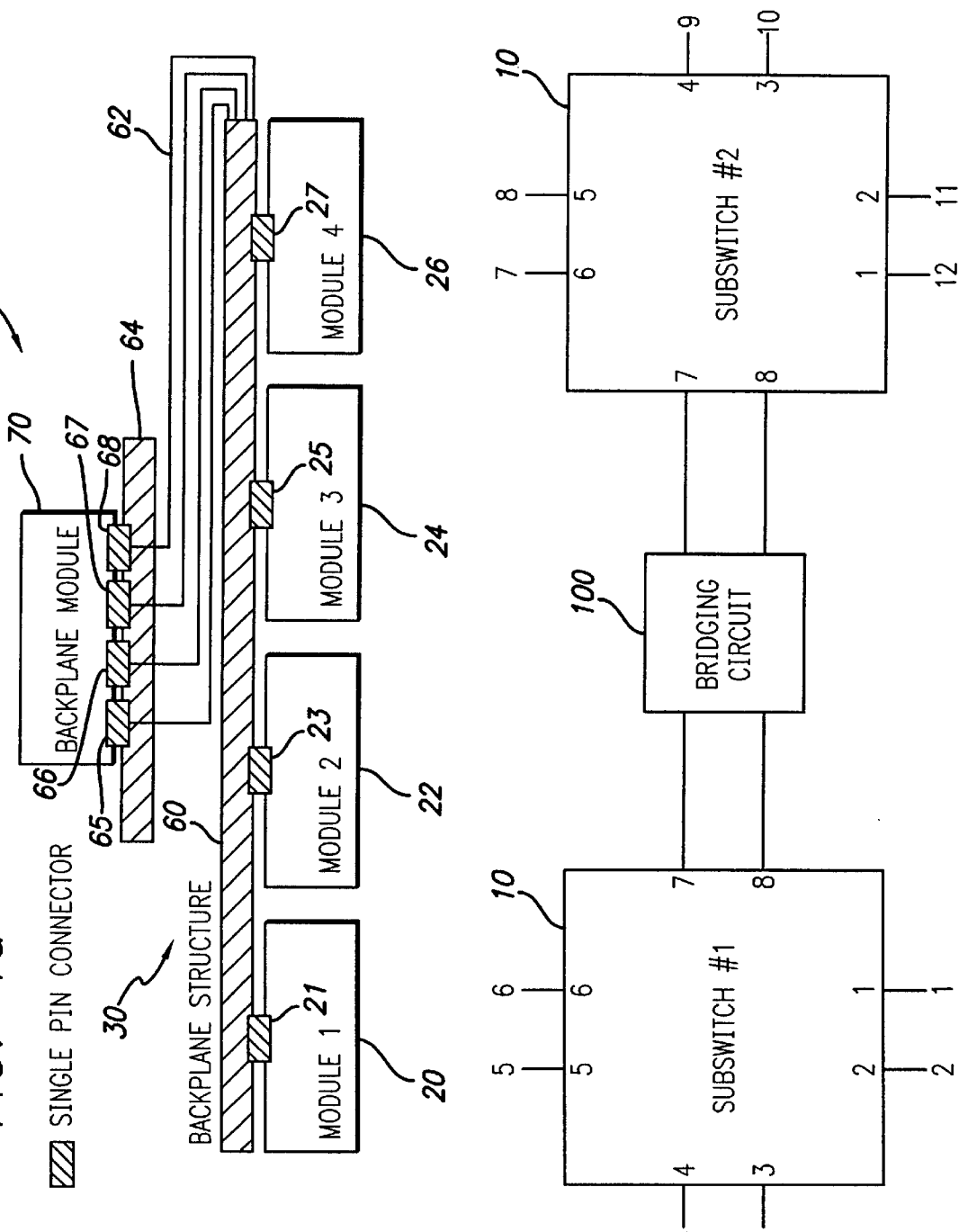

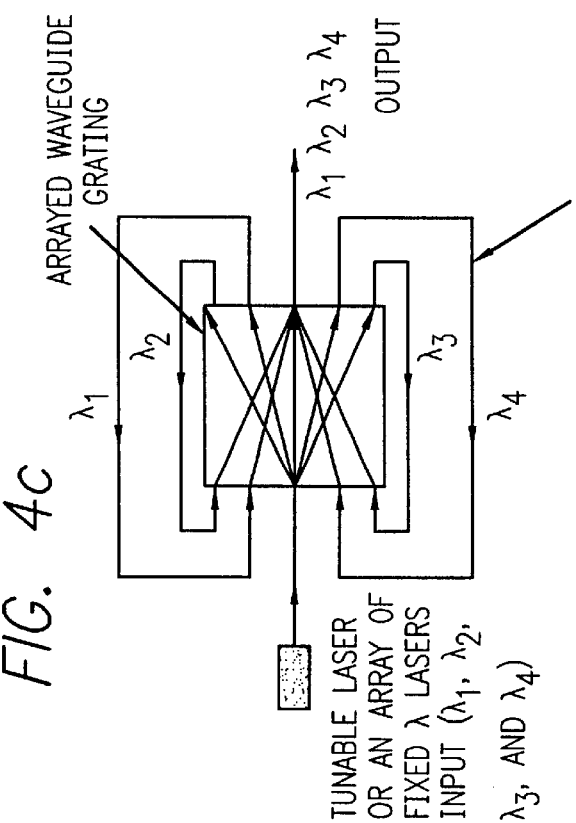

OPTO-ELECTRONIC DISTRIBUTED CROSSBAR SWITCH

BACKGROUND OF THE INVENTION

1. Field of the Invention

The present invention relates to switching systems and methodologies. More specifically, the present invention relates to optical and electronic crossbar switching circuits, systems and techniques.

2. Description of the Related Art

A generic crossbar switch allows an incoming signal to a switch port to be directed (switched) to any other port. Crossbar switches are used in radar and numerous other applications to distribute radio frequency and/or digital signals from one source (e.g., an antenna) to multiple destinations (e.g., processors) and vice versa. Previously, crossbar switching was implemented electronically. However, these systems are hampered by capacitive effects and distance limitations and are typically limited to digital signals. Prior optical crossbar switching systems have been also been limited to digital signals.

Hybrid arrangements use a combination of electronic and optical switching elements. However, hybrid crossbar switching systems require a large number of connectors. Further, historically, these connectors have been found to be somewhat unreliable.

For radar and a number of other applications, there is currently a need to switch a large number of high frequency analog signals (e.g., signals in the 100 gigahertz range) between a number of processors and hundreds or thousands of elements of an antenna array.

Accordingly, a need remains in the art for an improved system or method for crossbar switching of high-speed digital analog signals. There is a particular need for a system or method for crossbar switching of high frequency analog signals.

SUMMARY OF THE INVENTION

The need in the art is addressed by the switch module and backplane designs of the present invention. The inventive module includes a first filter for providing a single input/output port, a transmitter for launching a signal through the port in a first direction, and second filter for receiving signals from the port in a second direction, the second direction being opposite from the first direction.

In a specific implementation, the module further includes plural receivers connected to the second filter for receiving the signals through the port. In the illustrative embodiment, the transmitter is an optical transmitter, the receiver is a photodetector, and the first and second filters are optical filters. The transmitter may be a tunable laser and the system may be implemented with wavelength modulation. In the illustrative embodiment, an arbitration circuit is provided to regulate data transmission and reception.

When complemented with an interconnect mechanism, the module is part of a novel crossbar switch design. In the preferred embodiment, the interconnect mechanism is a backplane having n input/output ports adapted to communicate with the ports of the modules. Specifically, the backplane includes n first filters, each first filter being coupled to a respective one of the backplane ports, and n coupling elements. The coupling elements may be second filters. In any event, an output of each of the n first filters is connected a respective one of the n coupling elements. The backplane further includes n splitters, each splitter being coupled to an input of a respective one of the n first filters on one end and to a unique set of n coupling elements on another end thereof. The unique set of coupling elements includes all of the n coupling elements except the respective one of the coupling elements to which each the corresponding first filter is output coupled.

Many alternatives for the interconnect mechanism are proposed including a single optical fiber, a lens disposed on each of the modules, a diffusion plate, a holographic lens, or a matrix of optical fibers.

The switches may be interconnected with bridging circuits to provide a network or interconnect fabric. The bridging circuit may include at least two input/output ports, a first optical filter coupled to each of the input/output ports, an optical transmitter coupled to each of the first filters, and a second optical filter coupled to each of the first filters. Plural detectors are connected to each of the second optical filters and a multiplexer is connected to each of the detectors and each of the optical transmitters.

In addition to optical filters, the use of time division multiplexing (TDM) and code division multiple access (CDMA) implemented either electrically or optically can be used to increase the number of independent users that the distributed switch handles.

The purpose of the invention is to provide digital high data rate or high frequency analog transmit and receive interconnections between and within units that are interconnected via a backplane interconnecting structure or fabric made up of a single fiber with optical filtering.

BRIEF DESCRIPTION OF THE DRAWINGS

FIG. 4a is an alternative embodiment of the backplane in accordance with the teachings of the present invention.

FIG. 4c is a block diagram of a wavelength selectable filter.

FIG. 4d is a schematic diagram of the wavelength selectable filter of FIG. 4c.

FIG. 5 illustrates the concept for networking switches where, in the example case shown, M=8 users is the maximum users for one "subswitch" and the desired total number of users for the "full" switch in this example is N=12.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
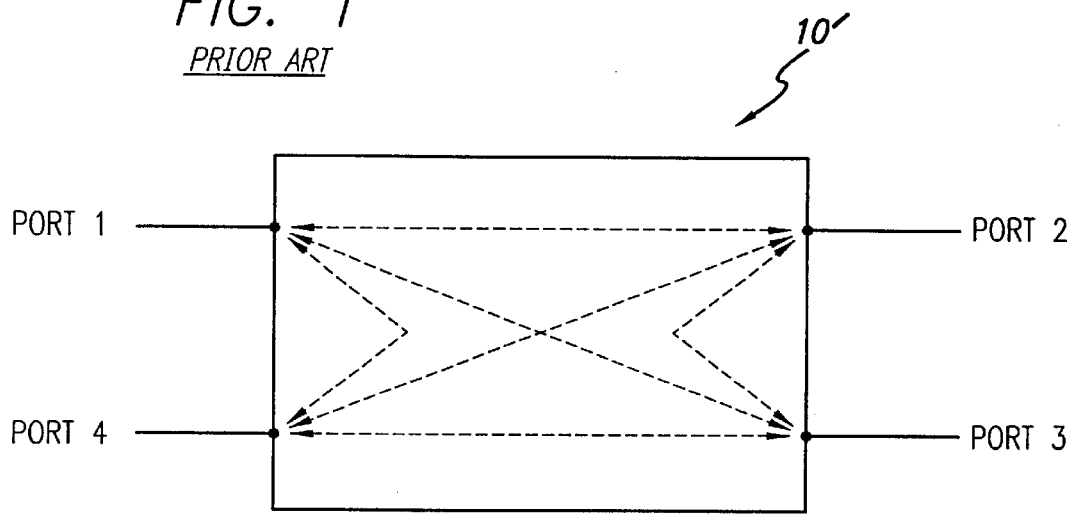
FIG. 1 is a diagram showing a typical 4×4 crossbar switch.

FIG. 1 is a diagram showing a typical 4×4 crossbar switch. The generic crossbar switch 10' allows an incoming signal to a switch port to be directed (switched) to any other output port. In the example, the switch 10' has the capability to have any one of four input ports routed to any or all of the other 3 output ports for both transmission and reception at the same time and is therefore defined as a 4×4 switch.

Figure 2:
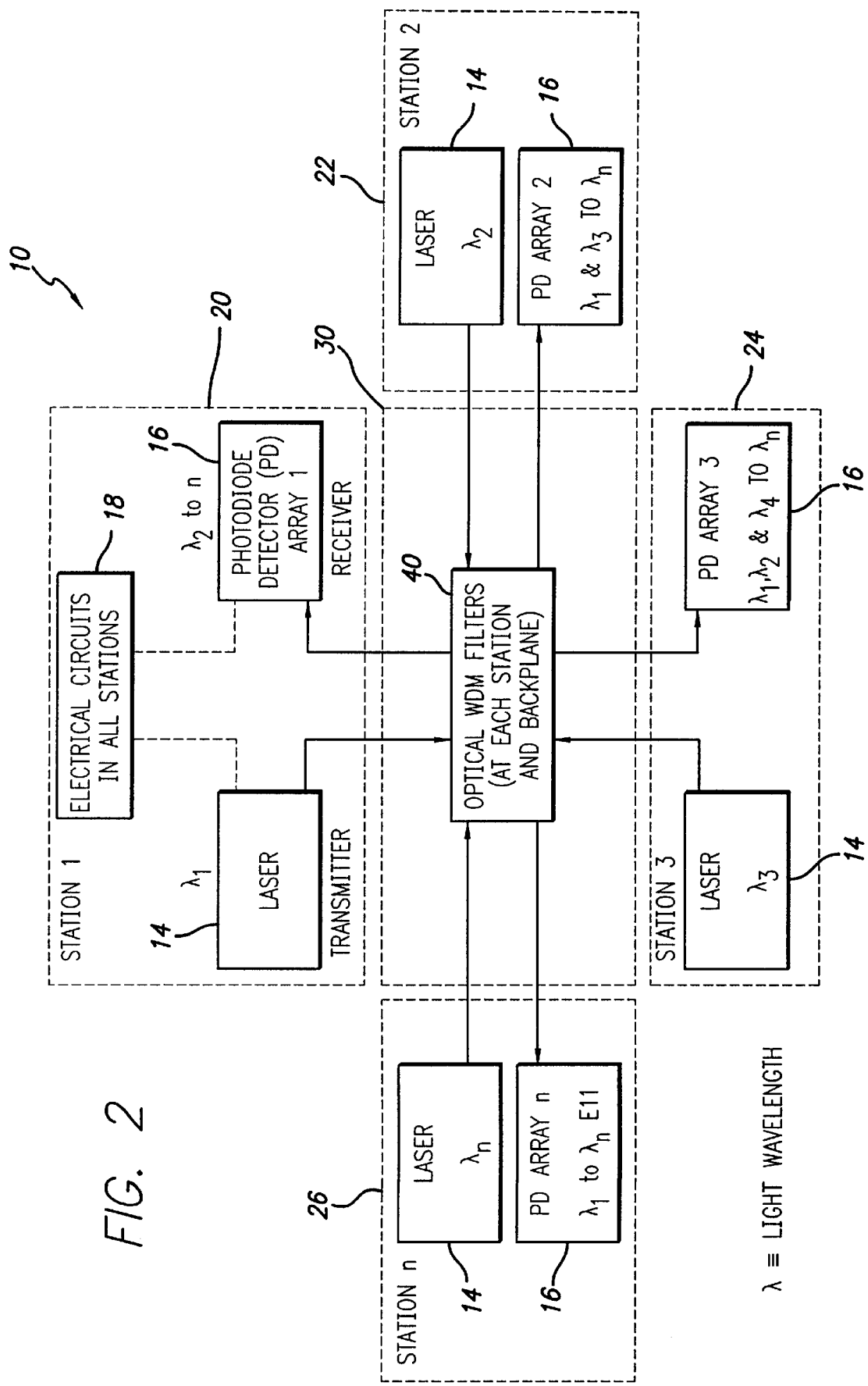
FIGS. 2 and 3 show one possible configuration for an n×n optical crossbar switch in accordance with the teachings of the present invention. The switch is shown in FIG. 2 and the distributed nature of the switch with components/subsystems is shown in FIG. 3.
Figure 3:
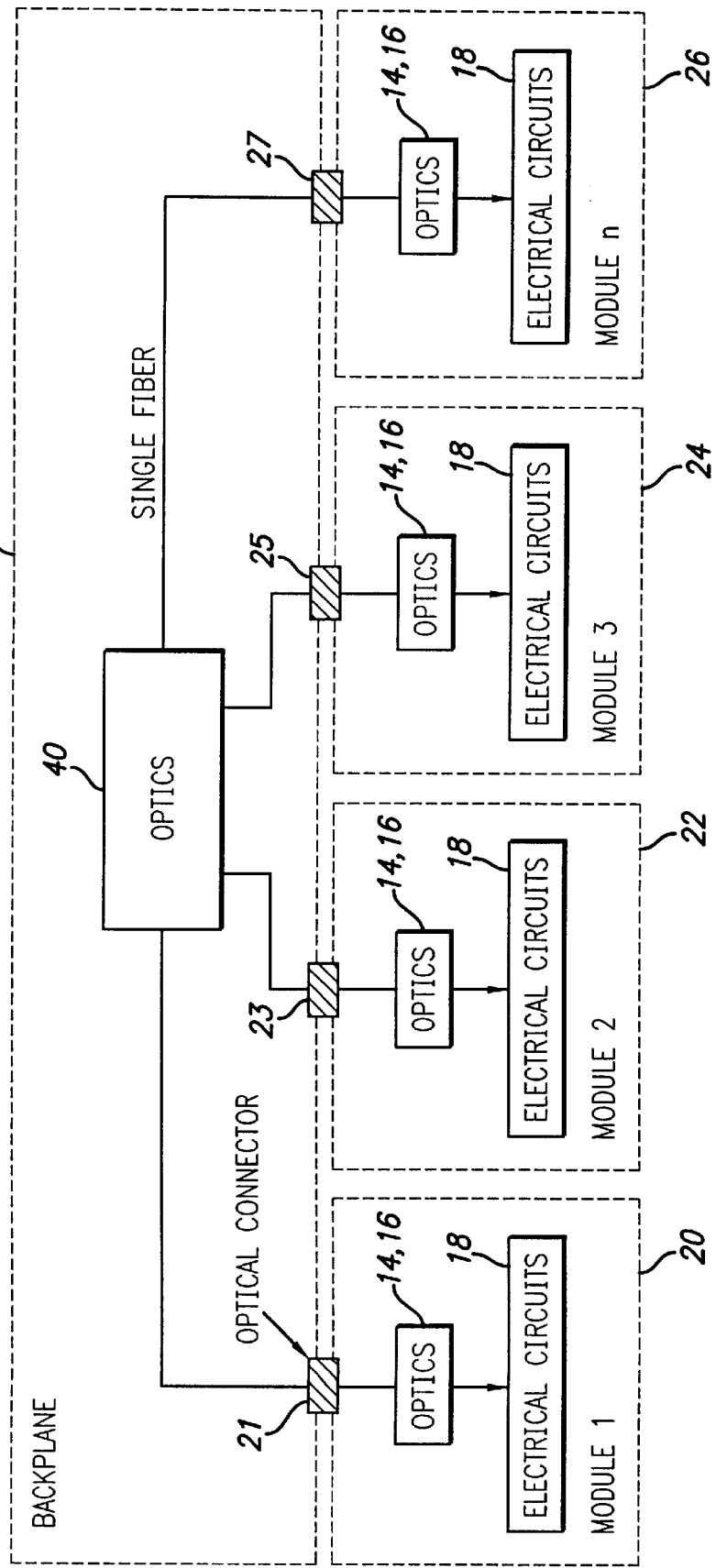

FIGS. 2 and 3 show one possible configuration for an n×n optical crossbar switch in accordance with the teachings of the present invention. The switch is shown in FIG. 2 and the distributed nature of the switch with components/subsystems is shown in FIG. 3. The symbol, $\lambda_m$ is used for a given light wavelength designated by the letter m, m equal 1 through n wavelengths. As illustrated in FIGS. 2 and 3, the switch 10 includes n modules (where n=4 in FIGS. 2 and 3) 20, 22, 23 and 26 connected to a common backplane 30 optically via a single connector. Each module includes input transducers and output transducers. In the illustrative embodiment, the output transducers are transmitters (e.g., lasers 14) designed to operate a specific optical wavelength ($\lambda$), and the input transducers are arrays of photodiode detectors 16 that demodulate the electrical signal modulated onto carrier wavelengths. In the preferred embodiment, each laser 14, outputs light at a wavelength, e.g., $\lambda_1$, at one of the many International Telecommunications Users (ITU) standard fiber-optic telecommunication channels. The laser 14 is modulated with electrical signals (either digital or analog) and sent via the backplane 30 to the other modules.

Each module also includes an array of photodiodes 16 operative at a set of alternative wavelengths, e.g., $\lambda_2$ to $\lambda_n$ for the first module 20. Note that the operating frequency of the laser transmitter of each module is unique and the photodiode detectors of each module are designed to receive signals transmitted by the other modules. The photodiode detectors 16 respond to a large optical bandwidth (delta $\lambda$). The photodiode detectors 16 can be used as switches in combination with the detection (demodulation) function, where, as switches, they can be turned 'off' or 'on' under the control of an electronic circuit.

In the best mode, optical WDM/WDD filters, that can add in or separate out a particular wavelength or group of wavelengths, are used to add the wavelengths onto a fiber, separate out the wavelength(s) as output(s), or pass on one or more wavelengths.

Hence, in accordance with the present teachings, the crossbar switch 10 (referred to herein as an 'optical crossbar switch') uses plural light wavelength carriers (optical frequencies). As will be appreciated by those skilled in the art, an electrical signal may be modulated onto each light wave carrier and launched onto a fiber. The signal is recovered from the backplane 30, which, in the illustrative embodiment, uses optical filters to add launch or separate out the signals. The carrier wavelengths with their modulated signals do not interact in the fiber and can travel in either direction (i.e., bi-directionally) therein. Those skilled in the art will also appreciate that this is not the case with electrical signals inasmuch as electrical signals have electromagnetic and/or electrostatic cross coupling within and outside of the cable when sent on a single electrical cable.

Figure 4:
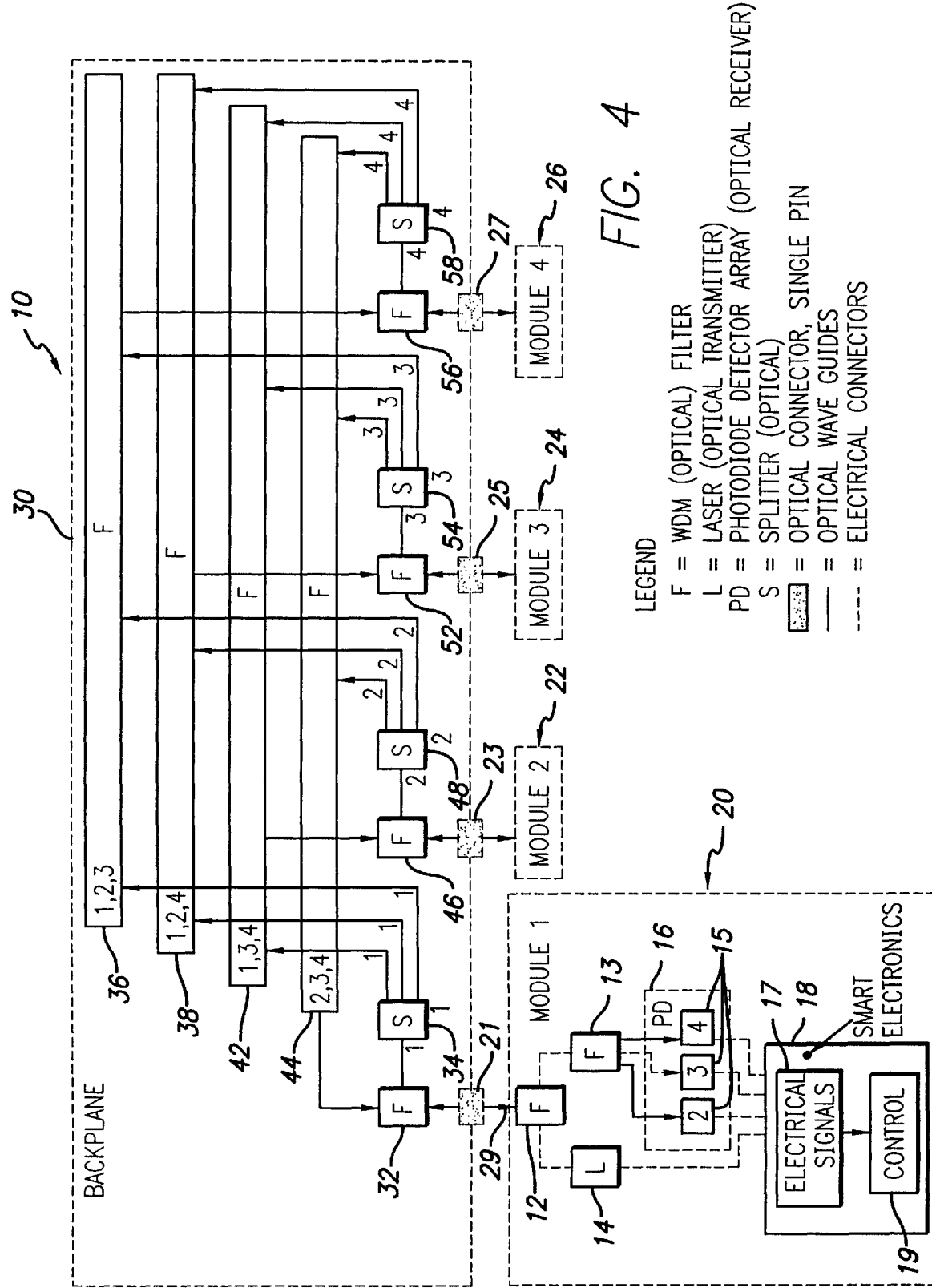
FIG. 4 is a block diagram showing the crossbar switch of FIGS. 2 and 3 in more detail.

FIG. 4 is a block diagram showing the crossbar switch of FIGS. 2 and 3 in more detail. As shown in FIG. 4, the output of each laser 14 in each module 20, 22, 24 and 26 is fed into a first WDM/WDD filter 12. The first filter 12 sums all the signals going out of and coming into each module and thereby routes the modulated laser signal out and the incoming signals into the array of photodiode detectors 16 that make up the optical receiver. In general, the optical filters map the inputs from the lasers in each of the other modules to other modules. The detector array 16 includes plural detectors 15 that demodulate electrical signal from carriers coming into the module from the other modules. The first and second WDM filters 12 and 13, respectively, separate the wavelengths from the other modules and route the data to a specific detector 15. In each module, electrical outputs from the detectors 15 are routed via an electronic interface 17, in an electronics unit 18, to a control element such as a processor 19. The electronic unit 18 generates and routes modulated digital or analog electrical signals to the transmitter 14 and demodulated data from the photodiode detectors 15 to the processor 19. A second WDM filter 13, in conjunction with the array of photodiode detectors 16, allows any given signal, at a specific wavelength, to be received. Each detector can be used as a switch by electrically turning the detector output on or off. The use of photodiodes and lasers as switches is known in the art. Conventional techniques can be used to stop signals from being sent from a laser or received by a detector.

In the illustrative embodiment, the electronic circuit 18 is "smart" in that it includes a protocol arbitration and reconfiguration, signal routing and storage capabilities. In the best mode, these features are implemented with control signals, software and memory. Crossbar switching is accomplished using each detector's switching capability to route only one output of the many inputs from the detector array.

The invention uses optical wavelength division multiplexing (WDM) and wavelength division demultiplexing (WDD) of digital and/or analog signals in a quasi-passive circuit combination to provide a reconfigurable and distributed optical crossbar electronically controlled switch. In the illustrative embodiment, the main components, the WDM and WDD filters, are passive. The WDM and WDD filters are typically identical and it is their usage that determines whether they act as a WDM or WDD or as both. Typically the acronym 'WDM' is used to describe either or both the WDM and WDD function.

All signals leave and enter the module via a single optical port which, in the illustrative implementation is an optical connector (21, 23, 25, or 27). This single signal input/output optical port is a significant feature of the present invention. A fiber 29 from the module input/output port connector 21 carries light to and from the backplane 30. The connector on each module, e.g., 21, can be implemented using a single pin and allow blind mating of the module connector to the backplane. The optical waveguides can be fibers or waveguides embedded in a substrate and interconnected in the backplane(s) as shown in FIG. 4a.

The backplane 30 is a combination of WDM filters and optical splitters which route the optical carriers between the modules. The backplane 30 includes a first WDM optical filter 32, 46, 42 or 56 which is connected to a corresponding connector 21, 23, 25 or 27, respectively, for each corresponding module 20, 22, 24 or 26, respectively. Signals from each module 20, 22, 24 or 26 are received by the corresponding first WDM filter 32, 46, 42 or 56, respectively, and fed to a corresponding splitter 34, 48, 54 or 58, respectively. Each splitter feeds a unique set of second WDM filters 36, 38, 42 and/or 44. For example, the first splitter 34 feeds the first three second filters 36, 38 and 42 with a signal transmitted by the first module 20. Signals transmitted by the other modules are received by the first module through the WDM filter 44 and the filter 32 of the backplane 30. The numbers 1 through 4 in or near each of the filters are the light wavelengths of the laser 14 in each of the modules, 1, 2, 3 and 4. Note also that in the best mode, WDM filters are used to distribute the signals instead of splitters, as WDM filters will reduce losses associated therewith.

FIG. 4a shows an embodiment of the backplane in FIG. 4 where the backplane 30 can be separated into parts, 60 that are adjacent to each module and part adjacent to the backplane module 64. Inputs and outputs of the backplane 64 are where wavelengths from all the modules come together and are sent out to the modules. The part of the backplane 60 is associated with the components in the lower part of the backplane 30 of FIG. 4 (i.e., 32, 34, 46, 48, 52, 54, 56 and 58) and the part of the backplane 64 is associated with the upper components (36, 38, 42 and 44) in the backplane 30 of FIG. 4 and that are located in the backplane module 70 in FIG. 4a. The backplane structure section 60 is adjacent to each module (1 through 4) and the backplane section 64 is adjacent to the backplane module 70. The backplane sections 60 and 64 are connected by fibers that allow the switch modules 1, 2, 3 and 4 to be widely separated.

Figure 4B:
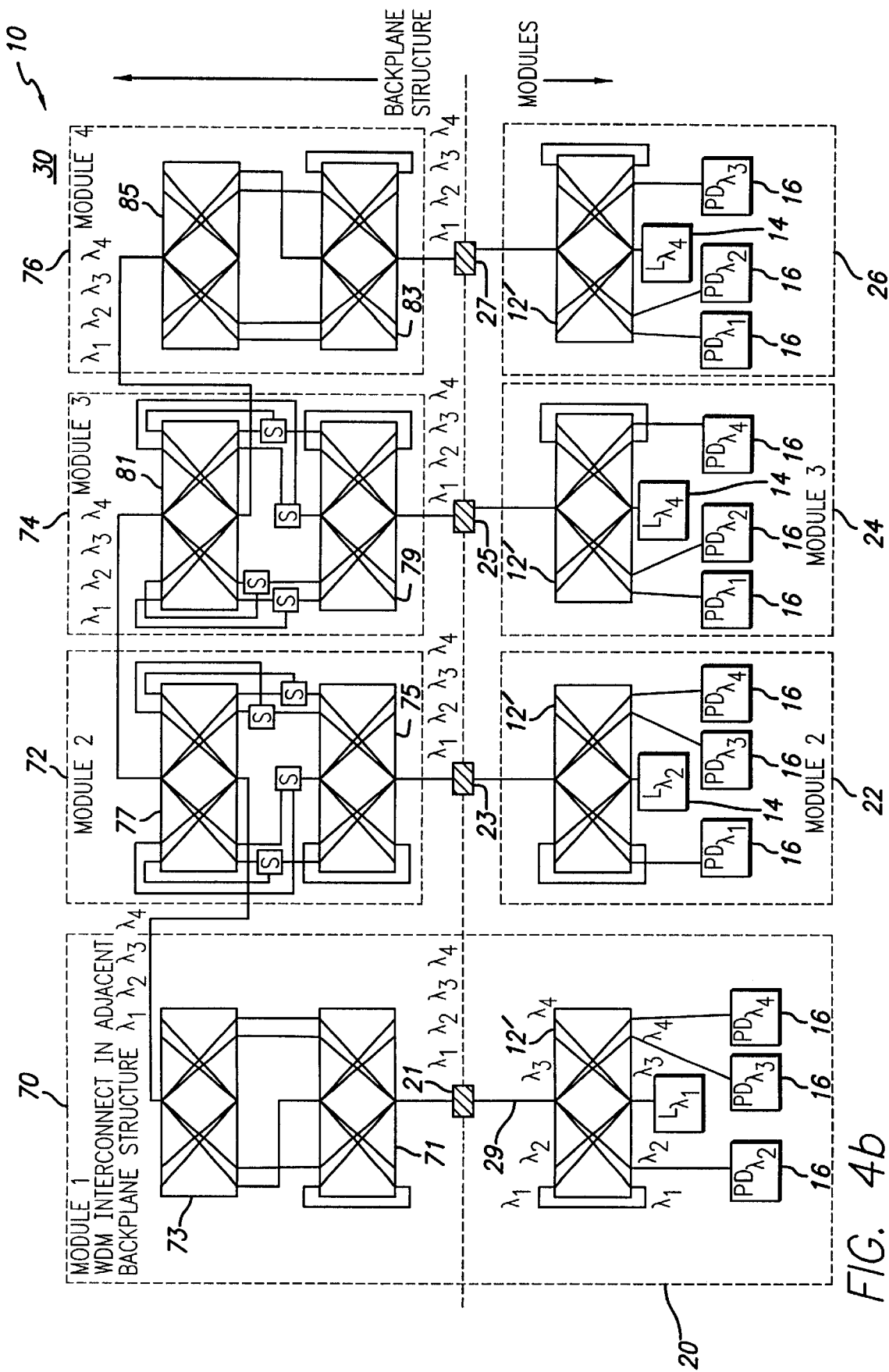
FIG. 4b is an alternative embodiment of the crossbar switch of the present invention with a backplane structure configured as a single fiber backplane in accordance with the teachings of the present invention.

FIG. 4b is an alternative embodiment of the crossbar switch of the present invention with a backplane structure configured as a single fiber backplane in accordance with the teachings of the present invention. As an extension of the arrangement of FIG. 4a, FIG. 4b shows a unique configuration by which the WDM filters are implemented using wavelength selectable filters in a 4 module interconnect arrangement. In the switch modules 20, 22, 24 and 26, filters 12 and 13 of FIG. 4 are replaced by a single wavelength selectable filter 12'. Wavelength selectable filters (WSFs) are described more fully below (see FIG. 4c) and may be implemented in accordance with the teachings of U.S. Pat. No. 5,793,907, issued Aug. 11, 1998, to Jalali, et al., and entitled METHOD AND APPARATUS FOR WAVELENGTH SELECTIVE TRUE-TIME DELAY FOR OPTICALLY CONTROLLED DEVICE, the teachings of which are incorporated herein by reference. The device is a special combination of optical waveguides, in a compact configuration, that perform optical filtering and can be made as a small component.

FIG. 4c is a block diagram of a wavelength selectable filter. FIG. 4d is a schematic diagram of the wavelength selectable filter of FIG. 4c. The device is shown in FIG. 4b with four wavelengths that are used in the 4×4 crossbar switch in FIG. 4, but it can be designed for more, i.e., more than 100, wavelengths. The unique feature of the device is that it operates as an optical splitter and adder for multiple optical signals, each modulated on optical carrier and each of which is at a different wavelength. The device is contained in a compact package and operates without the larger splitting loss of a typical optical splitter operating with the same number of splits as this device has wavelengths. The device only has what is called 'excess loss' (loss neglecting splitting loss) in the star couplers used in the device (see FIG. 4d). This excess loss increases by a relatively small amount, compared to normal splitter loss (i.e., 10 log n, where n equals the number of splits) as the number of wavelengths (and thus splits) are increased.

Referring to FIG. 4c, the device input on the left (four input wavelengths that are serial or simultaneous) that come in on a single input fiber (as $\lambda_1$, $\lambda_2$, $\lambda_3$, and $\lambda_4$) are separated in the device outputs into 4 separate fiber (one for each $\lambda$) outputs on the right. Input wavelengths on the left can also be put into the device in FIG. 4c as four separate wavelengths and come out on the right summed by the device on a single fiber output. The device is reciprocal, so that the single or multiple (in the case shown) fiber inputs can be on the left (right) and the same separations occur on the right (left). Thus, input and outputs can also be utilized from both sides as shown in FIG. 4b.

Another feature of this device is that its outputs on the right (or left) can each be selectively fed back to four of the device inputs on the left (or right) with all signals routed out on one fiber output of the device on the right (or left). For the 4 wavelengths shown in FIG. 4c, this can be for a single wavelength (say $\lambda_1$) if only one is used or up to the four (shown in this case) at the same time. Relative delays of the pulsed signals that are modulated on the light at different wavelengths can be accomplished for the signals if the feedback fibers have different lengths (delays). Thus, pulsed signals can come out at the same time (simultaneously) if there is no delay difference in the feedback paths or be spread out in time if there is a delay difference in the feedback path, and be output all on the same fiber.

The fibers can be actual fibers or waveguides on the same substrate as the device. In FIG. 4d, note that each fiber has a unique length. This facilitates the wavelength selectability of the device and enables the device to be used for the WDM filters in the crossbar switch (as shown in FIG. 4b) in place of conventional WDM filters and allows the WSF flexible capabilities to be utilized.

For the switch in FIG. 4, the four wavelengths ($\lambda_1$, $\lambda_2$, $\lambda_3$, and $\lambda_4$) in FIG. 4c would be the wavelengths used in each module of the switch.

Returning to FIG. 4b, the backplane 30, modules 70, 72, 74 and 76 are implemented with two wavelength selectable filters 71 and 73, 77 and 75, 79 and 81, and 83 and 85, respectively. The interconnect configuration shown in FIG.

4b allows the backplane interconnect (as distinguished from backplane structure) to be made with just one fiber. Also the backplane structure is distributed, as it need not be a continuous structure. The interconnect arrangement is advantageous in that the single fiber backplane makes practical a wider area distribution of modules over long distances (e.g., up to several kilometers) because of the low signal loss in fiber (about 0.5 dB/km). The arrangement sums all wavelengths in the single fiber backplane and allows wavelengths to be routed from each module adjacent structure to other module-adjacent structures. This eliminates the backplane module shown in FIG. 4a and the associated multi-fiber lines that connect the backplane structure to the backplane module. The design of the interconnect for each WSF and between each WSF takes advantage of the WSF reciprocal nature and the "directivity" of each of the multiple lightwaves ($\lambda$s). The "directivity" here is meant to refer to the launching of the lightwave from a source (laser) into a fiber that establishes a direction similar to RF in a waveguide. Thus, multiple lightwaves in the fiber and also in the WSF are "directed" in the appropriate directions and can be going in different directions in the WSF and single fiber backplane.

The interconnect arrangement shown in FIGS. 4a and b can also be extended to a larger number of modules or users without departing from the scope of the present teachings.

In reference to the n×n optical WDM crossbar switch, in general, the same wavelength from a sender is delivered simultaneously to all receivers. Therefore, an arbitration or reconfiguration protocol is needed. A number of suitable arbitration schemes are known in the art. The following example is intended to illustrate how such a protocol could be used for this application. When a module wishes to transmit a message (here designated as a sending module, S) to some particular module (designated as a receiving module, R), it first sends a short connection request signal to R. Like all modules, R has an array of photodiodes, each of which is connected to an electrical decoding circuit which can sense via its smart electronics the arrival of a connection request signal. When the connection request signal from S is decoded by one of R's decoding circuits, the request is passed to a control circuit in R which determines whether or not R is currently able to accept a message from S. Once R has determined its current ability to accept the message from S, R causes a response to be sent to S to the specific detector in S's bank of photodiode detectors which corresponds to R's outgoing frequency. This selection of the detector in the bank of detectors is possible since the responding module, R, transmits at a specific wavelength, $\lambda$, that is mapped in each module (including S) to a specific detector. Thus, the response signal is sent to the detector in S that is connected to the WDM filter output ($\lambda$ port) that receives the $\lambda$ that was sent out by R. If R acknowledges that it is able to accept S's message, S proceeds with transmission of that message. If R is currently unable to accept the message, the control logic in S, operating at a higher level of the system protocol, determines whether to retry the message after a suitable delay or to stop trying to send the message. This illustrates how the WDM interconnect can avoid sending messages to busy receivers and is one method for crossbar reconfiguring.

It should be noted that any sender that sends out a signal on its given wavelength has that signal physically broadcast to all module receivers. Thus, receiver electronics in each module needs to have control to determine whether the incoming signal is to be "read" by that module. In that case, the arbitration software running on the processor 19 makes the decision as to whether the signal into the module receiver should be read or ignored based on which modules the signal is meant for and also whether the electronic memory for the receiving detector is able to receive data. Thus, an arbitration technique such as that described above, using connection request and response signals, can be used. The connection request signals will have an address code for the module(s) that are the intended recipients for the signal (message).

Like all crossbar switches, a WDM optical crossbar switch has some components that increase in quantity as $N^2$, where N is the number of users. In the case of the WDM optical crossbar switch, it is the number of WDM filter outputs and associated photodiodes (and decoding circuits) which grows at this rate (e.g., there are N modules and N−1 photodiodes per module). The question is, then, how to scale the WDM optical crossbar switch to large N so the components do not grow as $N^2$.

The solution provided here is similar to the solution that is customarily used with electrical crossbar switches, namely, to determine a feasible upper limit M for the maximum number of users which can be implemented in a single crossbar switch. FIG. 4 shows an example for which M=4. Then to implement systems which need more than M users, one simply cascades multiple crossbar switches together into a larger interconnect fabric.

FIG. 5 illustrates the concept for the example case where M=8 is the maximum users for one "subswitch" and the desired total number of users for the "full" switch is N=12. In this case, two eight-port crossbar switches 10 are coupled together with a bridging circuit 100 to provide an interconnect fabric with twelve users. For the case shown in FIG. 5, the users are the outer numbers and the bridging circuit allows simultaneous messages to be transferred between users on Switch #1 and Switch #2 where Switch 1 and 2 are the subswitches in a composite crossbar switch.

Suppose user #1 on Subswitch #1 wishes to send a message to user #5 on Subswitch #2. To achieve this the bridging circuit must perform two functions. First, it converts the wavelength of the original sender ($\lambda_1$) to a wavelength ($\lambda_7$ or $\lambda_8$) which does not duplicate that of any other sender on Subswitch #2. Second, it must perform another level of arbitration to ensure that the bridging circuit itself does not get overloaded.

Figure 6:
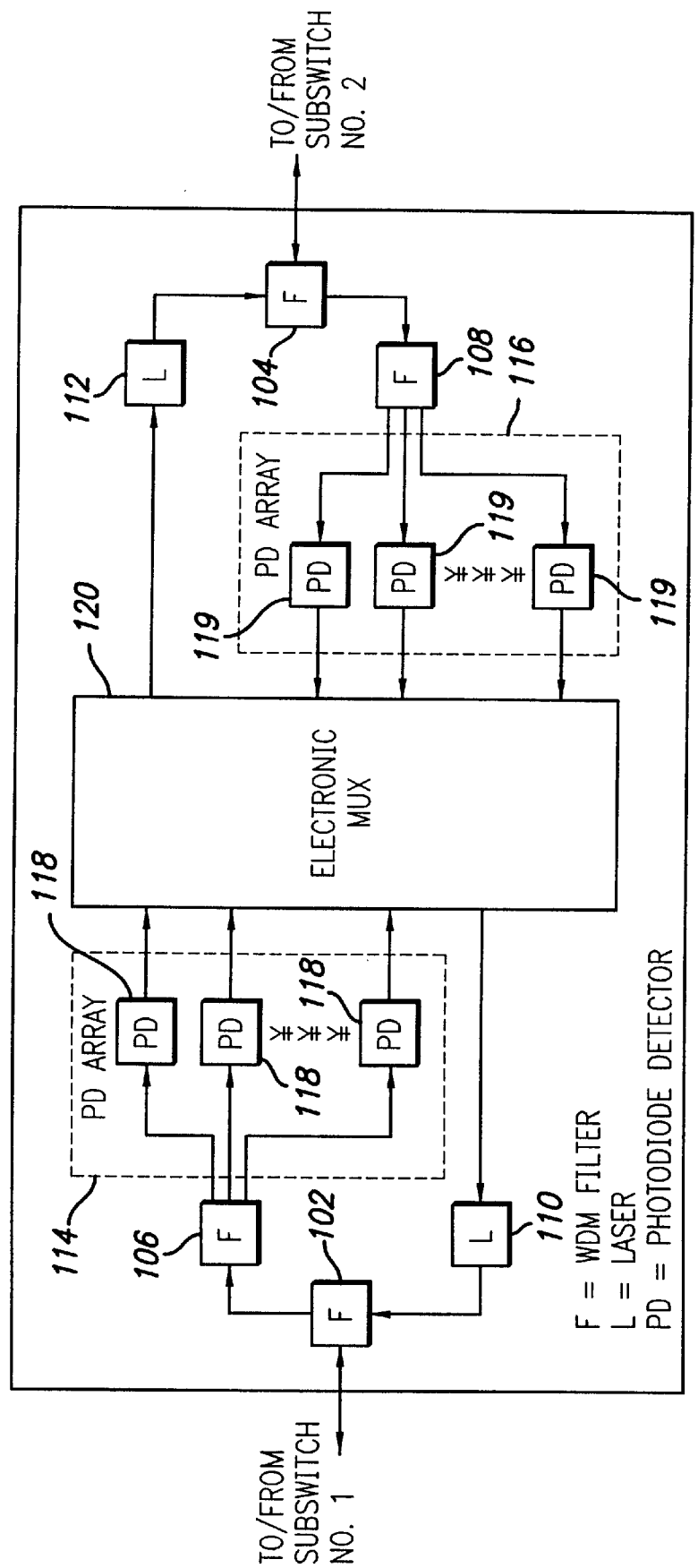
FIG. 6 is a block diagram of one channel of the bridging circuit shown in FIG. 5.

FIG. 6 is a block diagram of one channel of the bridging circuit shown in FIG. 5. In the illustrative embodiment, each channel of the bridging circuit 100 includes first and second first WDM filters 102 and 104. The first filter 102 communicates with the first switch and the second filter communicates with the second switch. The first and second first filters 102 and 104 provide signals to first and second photodetector arrays 114 and 116 via second WDM filters 106 and 108, respectively. The bridging circuit sends and receives optical signals in a manner similar to that employed by the modules 20–26. It must perform arbitration in some manner as well. A electrical multiplexer (MUX) 120 in the bridging circuit selects the incoming signal from one element (e.g., 118) in a photodiode array (114) and sends it to the laser 112 in the bridging circuit for retransmission. Thus, inside the bridging circuit one wavelength (i.e., $\lambda_a$) is received and detected, and the signal is then remodulated for retransmission using another wavelength (i.e., $\lambda_k$).

As an alternative to the use of cascaded switches and bridging circuits, another way to increase the number of user ports connected to the WDM optical crossbar switch is through the use of some technique to code the data so one channel (or port) can carry more than one data signal. Electronic time division multiplexing (TDM), frequency division multiplexing (FDM), and code division multiple access (CDMA) offer coding techniques for adding to the number of users.

Both TDM and CDMA networking techniques can be implemented either electronically and optically. The optical method uses fiber delays to generate the codes. The advantage of fiber optics in the use and generation of CDMA and TDM is that very narrow pulses can be modulated onto a light carrier. Thus, the system can potentially use data rates up to several gigahertz for basic data signals and very short pulses to encode the TDM and CDMA within each bit of the data signals put on each optical wavelength carrier used. An example of this type of use of both electronic and/or optical TDM or CDMA with FDM is given in FIG. 7.

Figure 7:
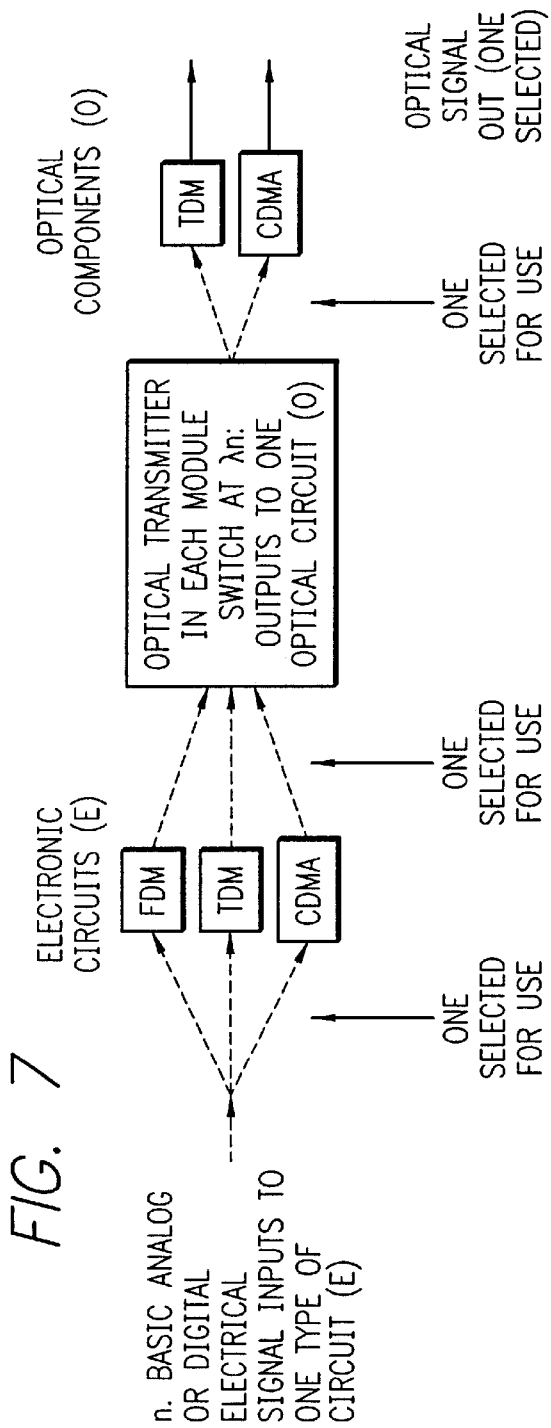
FIG. 7 is a diagram depicting an arrangement for increasing the data on each light wavelength used in accordance with the teachings of the present invention.

FIG. 7 is a diagram depicting an arrangement for networking switches in accordance with the teachings of the present invention. In FIG. 7, data signals can be modulated onto carriers either electronically prior to optical conversion for all three or optically for TDM and CDMA after conversion to an optical signal prior to going out to another module. Only one type of electronic circuit and/or optical circuit would be selected in the basic design. Also, while use of TDM and CDMA is for primarily digital signals, analog signals can be accommodated using sample data techniques that meet the Nyquist sampling frequency criteria.

Each module would also need circuits on its receive path for decoding signals based on the particular (FDM, TDM or CDMA) technique used for transmission. FDM needs frequency filtering and TDM and CDMA need time delays to decode the signals. Any of these techniques for analog signals would need the electrical output filtered. Both the electrical and optical techniques for encoding and decoding are known in the art. Use of fiber optics with its wide bandwidth capability allows these techniques to be effectively utilized at very high coding rates and also high data rates.

Both wavelength tunable lasers and optical filters can be used individually or in combination to add more capability and options (such as reconfiguration and reduced number of detectors) to the crossbar switch. A tunable laser allows fast electronic tuning of the laser wavelength ($\lambda$) so that transmitted signals can be modulated on the wavelength of choice. This means that the number of usable wavelengths can be increased over a fixed wavelength laser system by utilizing wavelengths not being used to send signals at a particular time. Statistics of usage would give a good estimate of the number of extra wavelengths and thus extra user locations that can be provided by the crossbar using the tunable laser.

A tunable wavelength filter provides fast electronic tuning of the wavelength it passes. Other wavelengths are rejected. This allows selection of the desired sender's message by turning the filter for selection of that sender's wavelength. Thus only one detector is needed in each receiver. The addition of tunable WDM filters with tunable lasers can reduce the number of separate WDM outputs to photodiode detectors at each module station and/or increase the number of users. These implementations of tunable lasers and/or filters in FIG. 4 would mean replacing the laser, WDM filters, and photodiode detectors in each module by some combination of the above components. Smart electronics would still need to be utilized to control the use of the components to maximize their effectiveness.

Figure 8:
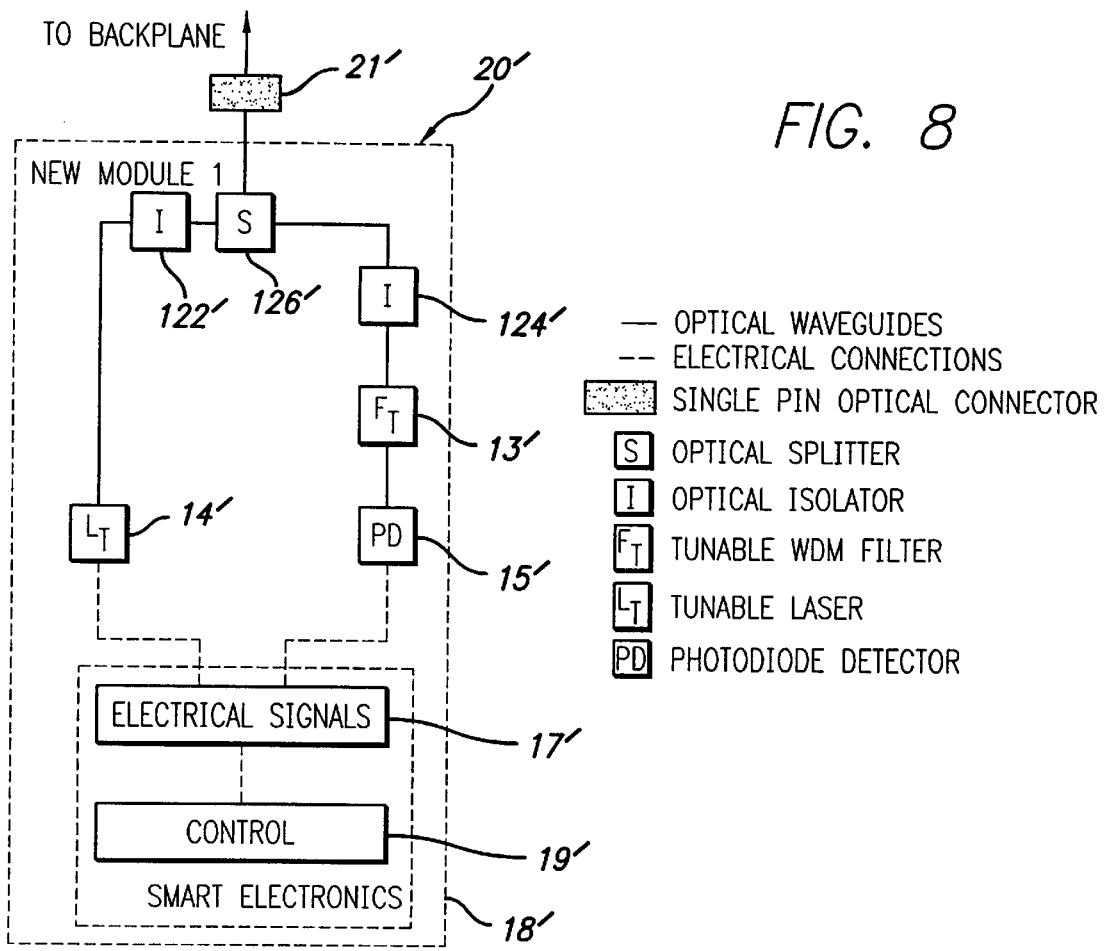
FIG. 8 shows how the modules shown in FIG. 4 might be configured with tunable lasers and filters.

FIG. 8 shows how the modules shown in FIG. 4 might be configured with tunable lasers 14' and filters 13'. With the exception of these elements and optical isolators 122' and 124' and a splitter 126', the module 20' of FIG. 8 is identical in design relative to the module disclosed in FIG. 4. The optical isolators prevent unwanted signals at the splitter from getting into the laser or photodiode detector, i.e., laser signals need to be kept out of the receiver detectors and input data signals need to be kept from getting to the laser. These tunable laser and tunable filters can be used for other capabilities in the crossbar switch such as in special signals for broadcast to all modules and bridging between other crossbar subswitches. Not shown, but needed, would be a backplane such as that shown in FIG. 4.

Since the WSF provides the capability to output separate wavelengths on individual fibers based on the wavelength of the optical signal, it can also be used with a tunable laser or bank of individual lasers (set up to emulate a tunable laser) as an active RF analog or digital switch for electrical signals modulated on a lightwave carrier. Thus, when the optical signal is desired to be switched from the input fiber to one of two or more output fibers, the electronically controlled wavelength tunable laser can be "tuned" to a wavelength that routes the input wavelength (signal) to the desired output fiber. Inasmuch as both RF analog and/or digital electrical signals can be modulated on the light carrier at any given wavelength, then the electrical signal can be switched using this device. This is a powerful additional application of the device as an RF analog and/or digital switch.

Also, inasmuch as the device has relatively low insertion loss (in the order of a few dB) and the tunable laser can be tuned very fast (on the order of nanoseconds) and since there can be a large number of output fibers, the device becomes a fast multiple selector switch with low loss and potentially low cost. There is currently not any competitive method for very fast and low loss switching of RF or digital signals modulated on an optical carrier.

In some applications in RF systems this could also be used only as an RF multiple output switch (i.e., not as a crossbar) where the RF signals are on an optical carrier and switching is needed. The use in the crossbar switch of the present invention thus adds an additional switch dimension, i.e., fast RF and/or digital signal switching.

Since the tunable laser can be either directly modulated up to about 20 GHz or used as the CW light input to an external modulator, the frequency capability of the switch can be in the 10's of GHz range depending on the external modulators maximum frequency (currently to greater than 100 GHz). Typically WDM filters could be used in a similar manner, but they would not be as flexible and/or compact, and they would not have the feedback capability with or without delays in a compact device. The RF switch use could be useful enough to put an RF carrier on an optical carrier and to use the device in place of an electronic (only) RF switch.

Figure 9:
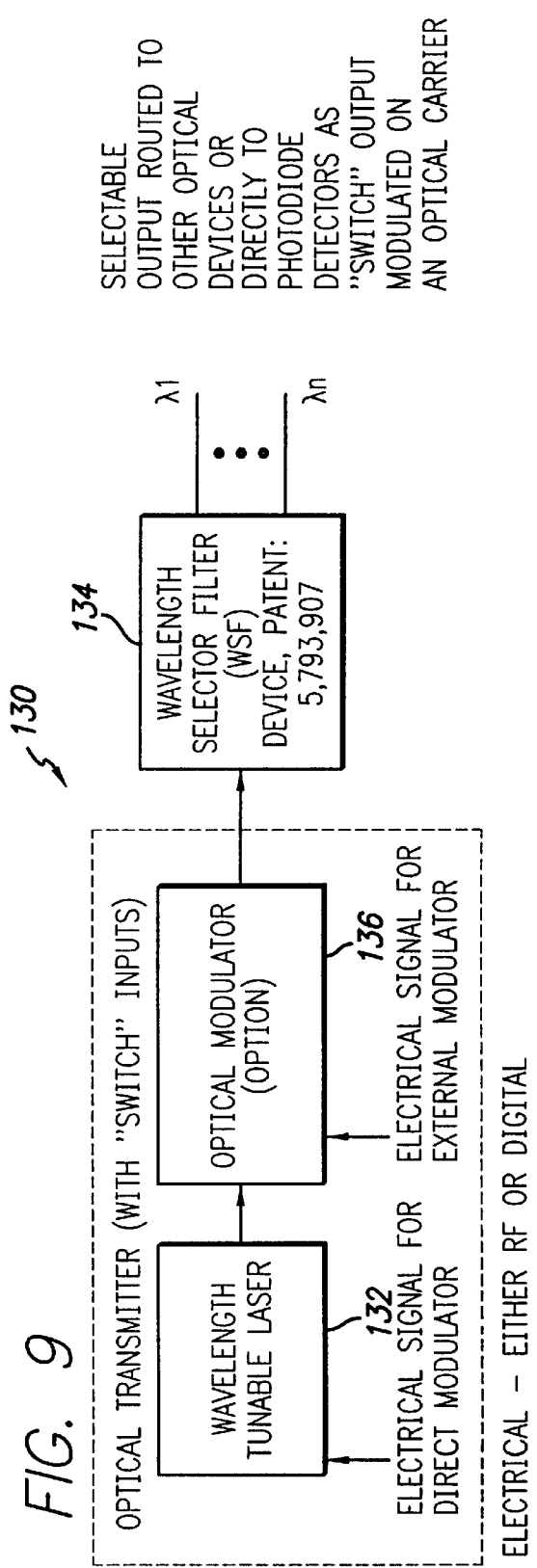
FIG. 9 is a block diagram of an RF analog or digital optical switch using a WSF device in accordance with the teachings of the present invention.

FIG. 9 shows a concept block diagram for such a switch. FIG. 9 is a block diagram of an RF digital optical switch using a WSF device in accordance with the teachings of the present invention. The switch 130 includes a wavelength tunable laser 132. The tunable laser can be either directly modulated or used to supply the CW optical input to an external modulator. The laser alone or with the external modulator serves as an optical transmitter which feeds a wavelength selectable filter 134. The electrical signal modulated on the light is the switch input and is switched to the switch output port by tuning the laser to a given wavelength associated with a WSF output fiber. The switch outputs can then be routed to other optical devices and/or directly to photodiode detectors to obtain the electrical output signal. The transmitter as described above can also be used with a tunable or non-tunable laser as the "laser" (transmitter) in the crossbar switch, in FIGS. 2 and 4.

There are two major wavelength bands currently used in optoelectronic technology, these are 1300 and 1550 nanometers (nm) wavelengths. The 850 nm wavelength band has not yet been used for WDM/WDD but this could change in the future. This 850 nm band could be utilized with multimode fiber for more economical devices. Components in all of these bands could be used in the crossbar switch. Use of multimode fiber, rather than single mode fiber for RF signals is currently not believed to be feasible but this could be possible in the future for short distance transmission.

Figure 10:
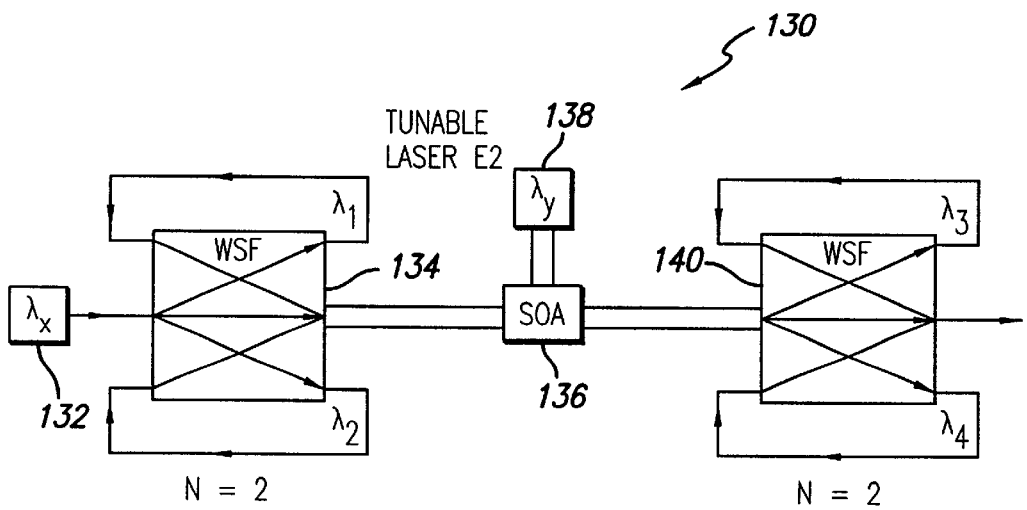
FIG. 10 is an arrangement for wavelength translation or changing a wavelength in a fiber to another wavelength in accordance with the present teachings.

FIG. 10 is an arrangement for wavelength translation or changing a wavelength in a fiber to another wavelength in accordance with the present teachings. The arrangement of FIG. 10 uses a technique known in the art of putting two wavelengths ($\lambda_x$ and $\lambda_y$) into a semiconductor optical amplifier (SOA) 136 to achieve a transfer of an electrical signal modulated on one lightwave carrier to another carrier. Due to the operation of the SOA, the modulation on the wavelength on one fiber (say wavelength $\lambda_1$ or $\lambda_2$) input to the SOA can be transferred to the other wavelength (say $\lambda_3$ or $\lambda_4$). This can be input to the SOA from another nonmodulated wavelength optical fiber input. When this other input is provided a tunable laser 138, then the transfer can be to the wavelength selected by tuning the laser. This would allow a transfer of the signal within a wavelength band (say 1550 nm band) or possibly between wavelength bands (1550 to 1300 nm). Use of this known technique for SOAs adds extra capability to the crossbar switch.

Both the use of tunable lasers/filters and use of the SOA, as shown in FIG. 10, are methods to make the crossbar switch reconfigurable and/or to increase the number of users. The use of SOA shown in FIG. 10 can be used as a bridging circuit between subswitches shown in FIG. 5 and thus replace the electronic mux shown in FIG. 6.

Light coupling and connectors are an important part of the crossbar switch and as stated previously either fiber or waveguides in a substrate can be used for interconnects. To eliminate connectors and/or some fiber and/or waveguide interconnects, there are methods to send the light signal between components without a connector, or "connectorless."

The teaching of a single input/output module port is a significant element in the crossbar switch of this disclosure. A simple way to implement a "connectorless" connection for a single fiber module input/output is the use of some type of lensing arrangement between modules or between a module and a backplane structure. The connector is eliminated by having the light go between module ports via an air gap; this is illustrated in FIG. 11.

Figure 11:
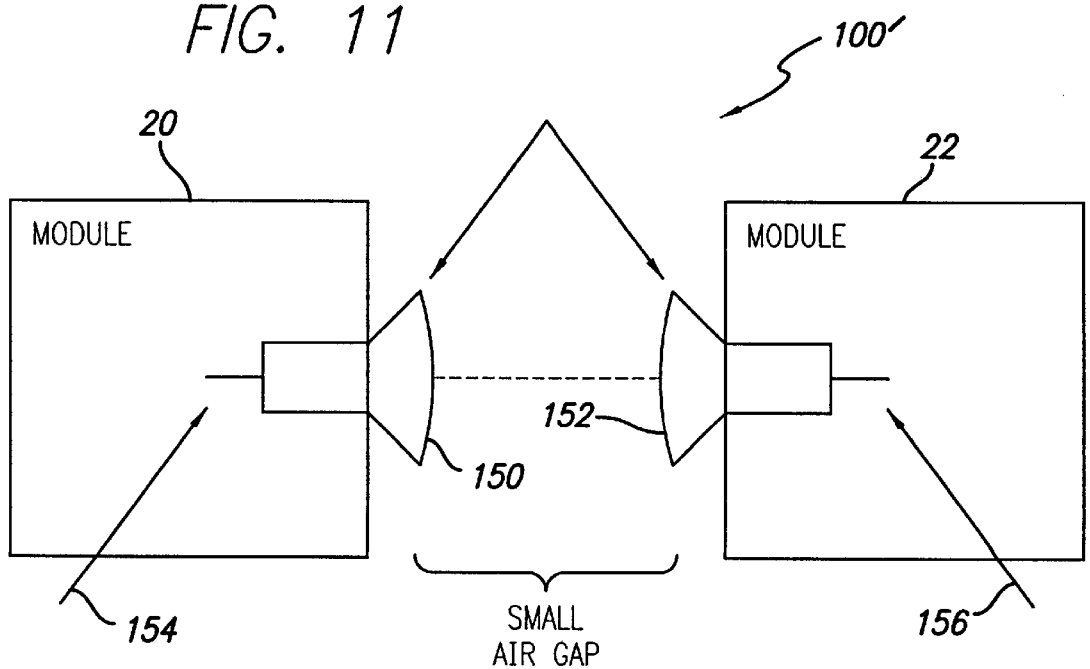
FIG. 11 is a diagram of an arrangement for interconnecting modules via an air gap without a physical connector in accordance with the present teachings.

FIG. 11 is a diagram of an arrangement for interconnecting modules via an air gap without a physical backplane in accordance with the present teachings. The arrangement 100' includes first and second modules 20 and 22, having lenses 150 and 152 connected thereto via optical fibers 154 and 156, respectively.

Other approaches to fill a need to couple a larger number (other than one) of light modulated signals between modules are provided below. The approaches would be implemented with respect to the optics 40 in the backplane of the n×n switch shown in FIG. 3 where light signals need to be distributed to or collected from a large number of modules. The following approaches are independent of wavelength $\lambda$. That is, they can pass one or many different wavelengths (i.e., they are different than WDM techniques). The simplest approach, illustrated conceptually in FIG. 12, is to spread the light to uniformly flood a thin sheet.

Figure 12:
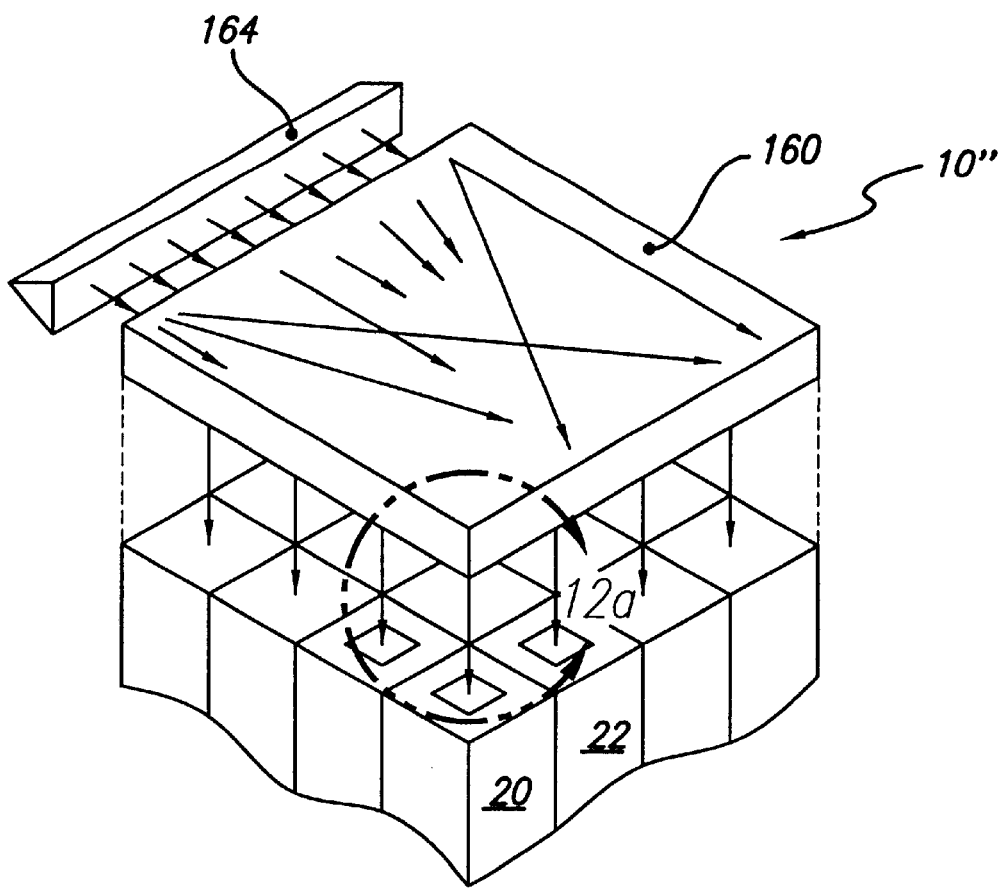
FIG. 12 is a diagram which illustrates array illumination using a diffusion plate.
Figure 12A:
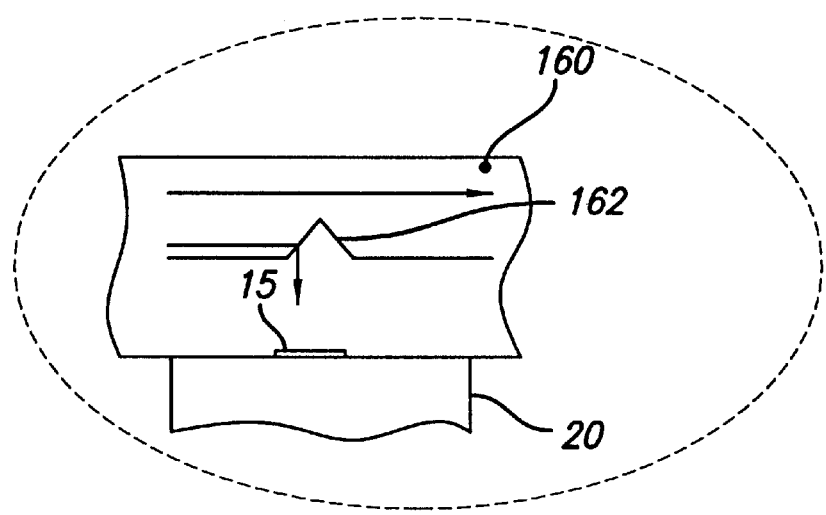
FIG. 12a is a magnified view of a portion of the diffusion plate in FIG. 12.

FIG. 12 is a diagram which illustrates array illumination using a diffusion plate. The diffusion plate 160 includes an array of notches 162 as depicted in the magnified view of FIG. 12a. The notches 162 in the plate 160 reflect a portion of the incoming light from an edge illuminator 164 down to an optical receiver, typically a photodiode detector 15 on each module. Since this technique spreads the light in two dimensions, the losses would be relatively large.

Figure 13:
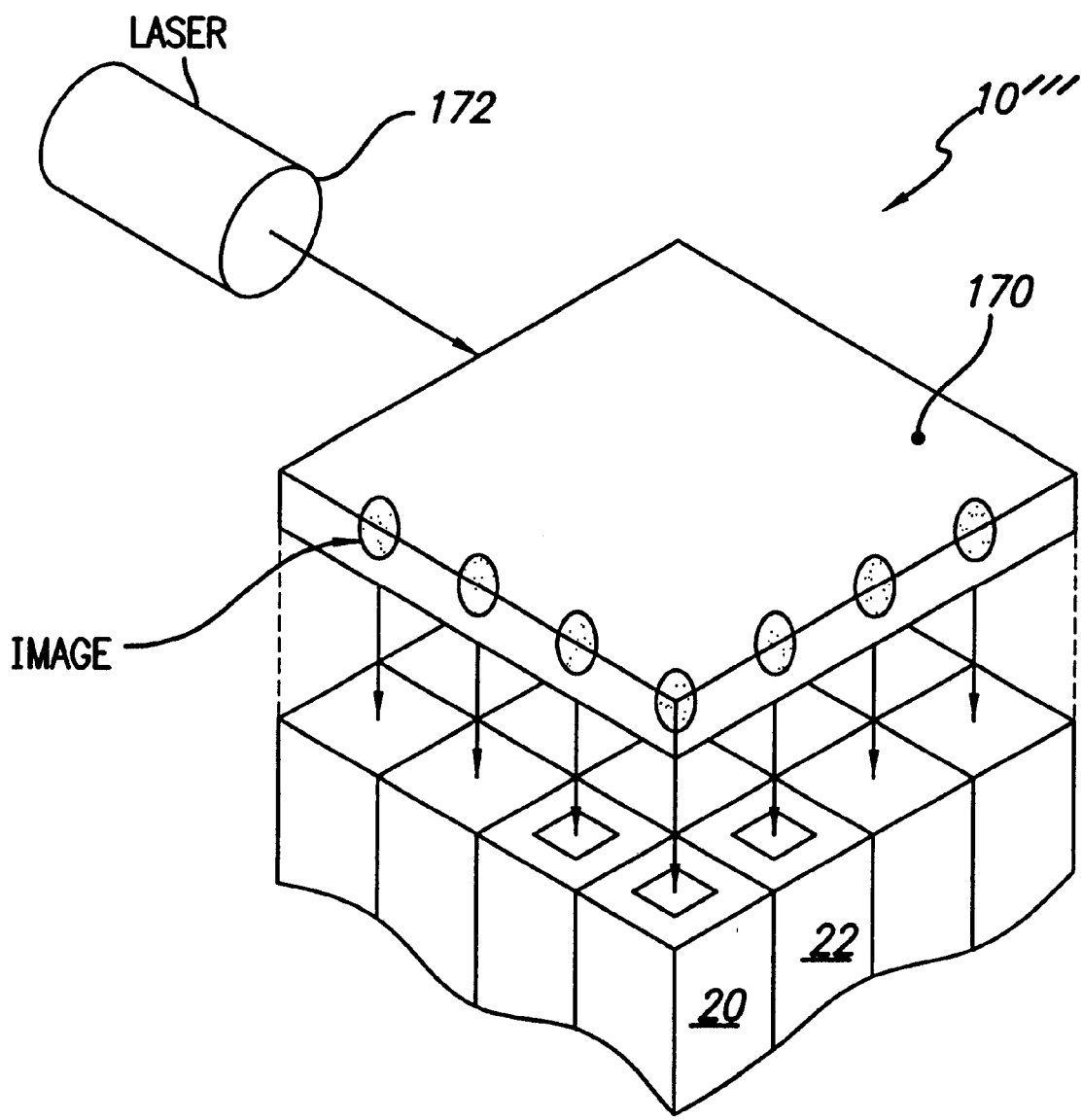
FIG. 13 depicts another approach for distribution of light without a backplane by which planar holographic lenses are used to split and focus a single beam into many portions directed to many modules in accordance with the teachings of the present invention.

FIG. 13 depicts another approach for distribution of light without a backplane by which planar holographic lenses are used to split and focus a single beam into many portions directed to many modules in accordance with the teachings of the present invention. The arrangement 10''' of FIG. 13 includes a holographic lens 170 which is illuminated by a laser 172. The arrangement 10''' would have better efficiency than the arrangement 10'' of FIG. 12, but may still suffer from excessive losses. This approach, however, should provide an extremely low cost for volume production.

Figure 14:
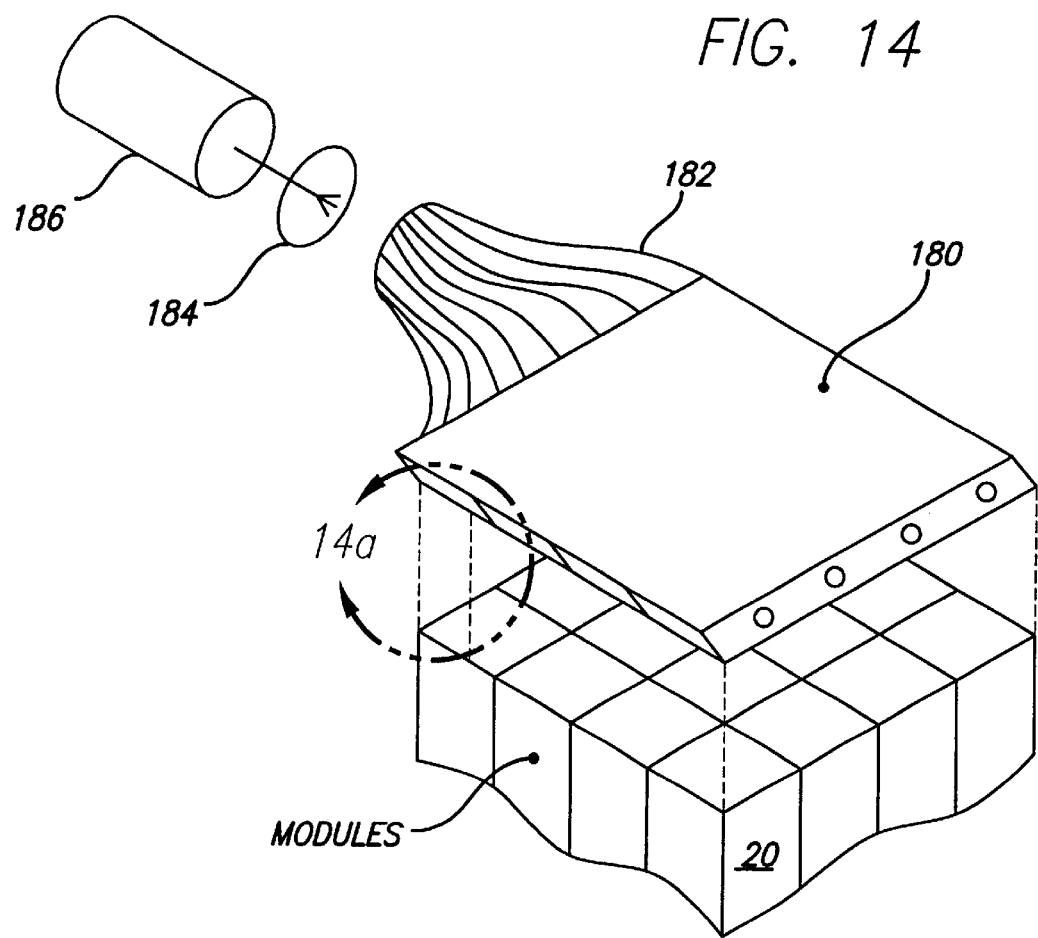
FIG. 14 depicts yet another arrangement for distribution of light without a backplane in accordance with the teachings of the present invention.

FIG. 14 depicts yet another arrangement for distribution of light without a backplane in accordance with the teachings of the present invention. The arrangement 10'''' includes a fiber alignment matrix 180 cast of optical grade fiber or other suitable material.

The matrix 180 is fed by a fiber or waveguide bundle 182. The fibers or waveguides 182 are arrayed at right angles to the modules to conserve space. In order to bypass the use of connectors, no fiber or waveguide is used in the module. Instead, lenses 184 are used to expand the light beam. Small monolithic arrays of detectors 190 are placed in each module. The detector array 190 should be made large enough to accommodate a reasonable misalignment between the fiber corporate feed and the module.

Figure 14A:
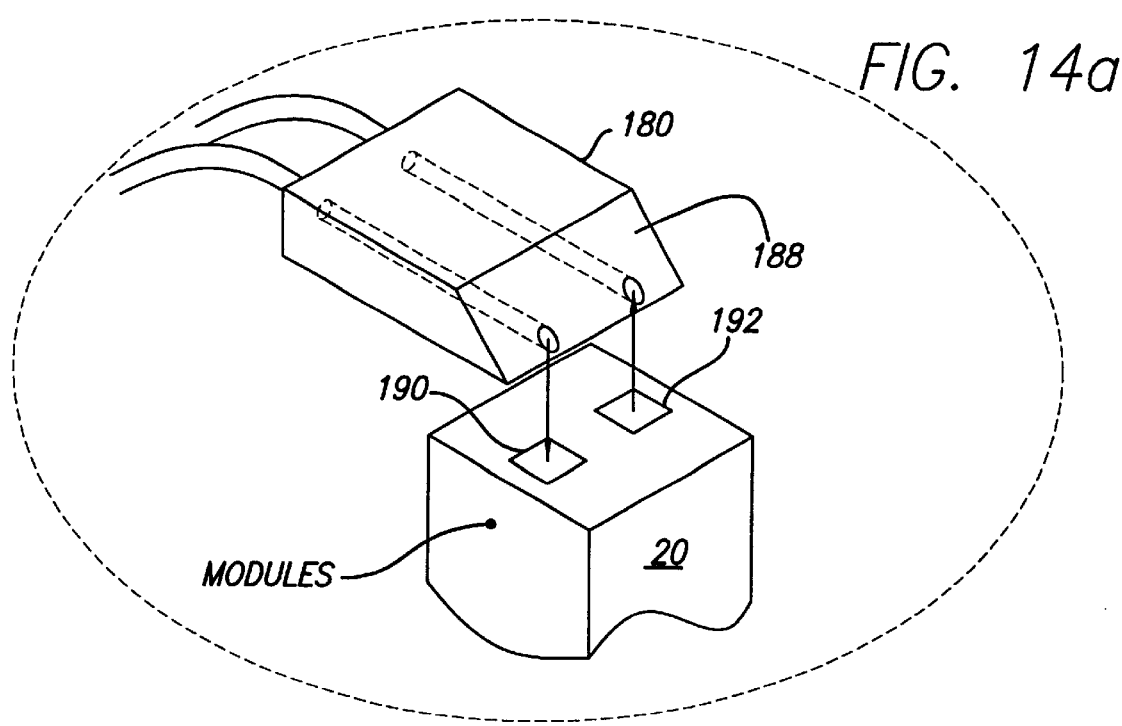
FIG. 14a is a magnified view of a portion of the matrix depicted in FIG. 14.

FIG. 14a is a magnified view of a portion of the matrix depicted in FIG. 14. The matrix includes a plurality of 45° cleave reflectors 188 which direct light in each fiber either to a detector array 190 or from a laser array 192.

For the use of the detector array as a receiver, electronics (not shown) within each module automatically scan the array to select the detector(s) with the strongest signal for processing. Use of micromachine technology (MEMS) might provide a very compact way to align the detectors.

Similarly, the laser diode array 192 is used for coupling to a receive fiber. The appropriate transmitting laser is selected automatically by the module electronics.

The single port light coupling previously described with the use of WDM can also be used to add a control light signal in the same single fiber module port approach but at a different wavelength than used in the crossbar switch optical filters. This other wavelength can be digitally modulated with serial bits that are coded with addresses and data for each user of the network. The serial data could carry the information to reconfigure or set-up each user for its main message or signals sent over the other wavelengths used in the crossbar switch. Since components at other shorter wavelengths could be relatively more economical, this would be a cost effective way to send control signals over the same single connector or "connectorless" input/output of a module. This is one way to send the arbitration signal described previously.

Thus, the OE reconfigurable distributed crossbar switch described herein offers the potential of semi-passive optical switching of digital and/or analog electrical signals modulated on a light carrier. It could use a basic single fiber backplane that operates with optical filters to interconnect and separate lightwave signals and arrays of switchable photodiode detectors or tunable lasers and tunable filters to select signals in a reconfigurable distributed architecture. The use of this optical approach to obtain large modulation electrical bandwidth, small size, single input/output module user ports for multiple signals, and single connector or "connectorless" implementation, offers the possibility of many users, growth in users and bandwidth, reliable integrated optical circuits and ease of manufacturing for low cost production. The additional use as a multiport switch for high frequency RF or digital signals modulated on a light carrier adds a significant new capability for use in fast and low loss RF signal switching applications. The invention has the same capability as an n×n crossbar switch. The advantages of the invention over current crossbar switch techniques are the use of mostly passive optical components, wide bandwidth, distributed and reconfigurable architecture, and large growth capability in data rate and number of users. One important advantage is that all signals can go over a single fiber through a single input/output unit port (which can be a single pin connector) on each unit that blind mates to the backplane and then can be routed via a single fiber backplane.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,
What is claimed is:
1. A module comprising:
first filter means for providing a single input/output port for the module;
transmitter means, including an optical transmitter, for launching a signal through the first filter means and the port in a first direction;
second filter means for receiving signals from the port and the first filter means in a second direction, the second direct on being opposite from the first direction;
plural receiving means including plural optical receivers, connected to the second filter means for received the signals received from the port; and
means for arbitrating between the plural receivers and the transmitter;
wherein the first and second filter means include first and second optical filters, respectively.
2. The invent on of claim 1 wherein the means for arbitrating including an electronic arrangement.
3. The invention of claim 1 further including an optical connector connected to the first filter means.
4. The invention of claim 1 further including means for arbitrating between the transmitter means and the second filter means.
5. The invention of claim 1 wherein the transmitter includes a laser.
6. The invention claim 1 wherein the laser is a tunable laser.
7. The invention of claim 1 further including a wavelength selective filter.
8. The invention of claim 1 further including means for modulating a wavelength of a signal output by the transmitter.

9. A switch module comprising:
an input/output port;
a first optical filter coupled to the input/output port;
an optical transmitter coupled to the first filter;
a second optical filter coupled to the first filter;
plural receivers connected to the second optical filter; and
an arbitration circuit connected to the plural receivers and the transmitter.
10. A crossbar switch comprising:
a plurality of modules, each module having a single input/output port;
means for connecting each of the modules wherein each of the modules includes:
a first optical filter coupled to the input/output port,
an optical transmitter coupled to the first filter, and
a second optical filter coupled to the first filter,
wherein each of the modules further includes plural receivers connected to the second optical filter and each of the modules further includes plural receivers connected to the plural receivers and the transmitter.
11. The invention of claim 10 wherein the means for connecting each of the modules includes a backplane.
12. The invention of claim 11 wherein the backplane includes n input/output ports adapted to communicate with the ports of the modules.
13. The invention of claim 12 wherein the backplane further includes n first filters, each first filter being coupled to a respective one of the ports.
14. The invention of claim 13 wherein the backplane further includes n coupling elements.
15. The invention of claim 14 wherein the coupling elements are second filters.
16. The invention of claim 15 wherein an output of each of the n first filters is connected to a respective one of the n coupling elements.
17. The invention of claim 16 wherein the backplane further includes n splitters, each splitter being coupled to an input of a respective one of the n first filters on one end and to a unique set of n coupling elements on another end thereof, the unique set of coupling elements including all of the n coupling elements except the respective one of the coupling elements to which each the corresponding first filter is output coupled.
18. The invention of claim 11 wherein the backplane consists of a single optical fiber.
19. The invention of claim 10 wherein the means for connecting includes a matrix of optical fibers.
20. A crossbar switch comprising:
a plurality of modules, each module having a single input/output port; and
means for connecting each of the modules, wherein said means includes a lens disposed on each of the modules.
21. The invention of claim 20 wherein each of the modules includes:
a first optical filter coupled to the input/output port;
an optical transmitter coupled to the first filter; and
a second optical filter coupled to the first filter.
22. The invention of claim 21 wherein each of the modules further includes plural receivers connected to the second optical filter.
23. The invention of claim 21 wherein each of the modules further includes an arbitration circuit connected to the plural receivers and the transmitter.
24. The invention of claim 20 wherein the means for connecting each of the modules includes a backplane.

25. The invention of claim 24 wherein the backplane includes n input/output ports adapted to communicate with the ports of the modules.

26. The invention of claim 25 wherein the backplane further includes n first filters, each first filter being coupled to a respective one of the ports.

27. The invention of claim 26 wherein the backplane further includes n coupling elements.

28. The invention of claim 27 wherein the coupling elements are second filters.

29. The invention of claim 28 wherein an output of each of the n first filters is connected to a respective one of the n coupling elements.

30. The invention of claim 29 wherein the backplane further includes n splitters, each splitter being coupled to an input of a respective one of the n first filters on one end and to a unique set of n coupling elements on a ther end thereof, the unique set of coupling elements including all of the n coupling elements except the respective one of the coupling elements to which each of the corresponding first filter is output coupled.

31. The invention of claim 24 wherein the backplane consists of a single optical fiber.

32. The invention of claim 20 wherein the means for connecting includes a matrix of optical fibers.

33. A crossbar switch comprising:

a plurality of modules, each module having a single input/output port; and means for connecting each of the modules, wherein said means includes a diffusion plate.

34. The invention of claim 33 wherein each of the modules includes:

a first optical filter coupled to the input/output port;

an optical transmitter coupled to the first filter; and a second optical filter coupled to the first filter.

35. The invention of claim 34 wherein each of the modules further includes plural receivers connected to the second optical filter.

36. The invention of claim 35 wherein each of the modules further includes an arbitration circuit connected to the plural receivers and the transmitter.

37. The invention of claim 33 wherein the means for connecting each of the modules includes a backplane.

38. The invention of claim 37 wherein the backplane includes n input/output ports adapted to communicate with the ports of the modules.

39. The invention of claim 38 wherein the backplane further includes n first filters, each first filter being coupled to a respective one of the ports.

40. The invention of claim 39 wherein the backplane further includes n coupling elements.

41. The invention of claim 40 wherein the coupling elements are second filters.

42. The invention of claim 41 wherein an output of each of the n first filters is connected to a respective one of the n coupling elements.

43. The invention of claim 42 wherein the backplane further includes n splitters, each splitter being coupled to an input of a respective on of the n first filters on one end and to a unique set of n coupling elements on another end thereof, the unique set of coupling elements including all of the n coupling elements except the respective one of the coupling elements to which each of the corresponding first filter is output coupled.

44. The invention of claim 37 wherein the backplane consists of a single optical fiber.

45. The invention of claim 33 wherein the means for connecting includes a matrix of optical fibers.

46. A crossbar switch comprising:

a plurality of modules, each module having a single input/output port; and means of connecting each of the modules, wherein said means includes a holographic lens.

47. The invention of claim 46 wherein each of the modules includes:

a firs optical filter coupled to the input/output port;

an optical transmitter coupled to the first filter; and a second optical filter coupled to the first filter.

48. The invention of claim 47 wherein each of the modules further includes plural receivers connected to the second optical filter.

49. The invention of claim 48 wherein each of the modules further includes an arbitration circuit connected to the plural receivers and the transmitter.

50. The invention of claim 46 wherein the means for connecting each of the modules includes a backplane.

51. The invention of claim 50 wherein the backplane includes n input/output ports adapted to communicate with the ports of the modules.

52. The invention of claim 51 wherein the backplane further includes n first filters, each first filter being coupled to a respective one of the ports.

53. The invention of claim 52 wherein the backplane further includes n coupling elements.

54. The invention of claim 53 wherein the coupling elements are second filters.

55. The invention of claim 54 wherein an output of each of the n first filters is connected to a respective one of the n coupling elements.

56. The invention of claim 55 wherein the backplane further includes n splitters, each splitter being coupled to an input of a respective one of the n first filters on one end and to a unique set of n coupling elements on other end thereof, the unique set of coupling element including all of the n coupling elements except e respective one of the coupling elements to which end of the corresponding first filter is output coupled.

57. The invention of claim 28 wherein the backplane consists of a single optical fiber.

58. The invention of claim 46 wherein the means for connecting includes a matrix of optical fibers.

* * * * *